(12) United States Patent
Le Clerc

(10) Patent No.: US 9,186,871 B2
(45) Date of Patent: Nov. 17, 2015

(54) PNEUMATIC TIRE, THE BELT OF WHICH IS REINFORCED BY A THERMOPLASTIC POLYMER FILM

(75) Inventor: Christophe Le Clerc, Clermont-Ferrand (FR)

(73) Assignees: Michelin Recherche et Technique S.A., Granges-Paccot (CH); COMPAGNIE GENERALE DES ETABLISSEMENTS MICHELIN, Clemont-Ferrand (FR)

( * ) Notice: Subject to any disclaimer, the term of this patent is extended or adjusted under 35 U.S.C. 154(b) by 369 days.

(21) Appl. No.: 13/263,975

(22) PCT Filed: Apr. 6, 2010

(86) PCT No.: PCT/EP2010/054486
§ 371 (c)(1),
(2), (4) Date: Jan. 9, 2012

(87) PCT Pub. No.: WO2010/115861
PCT Pub. Date: Oct. 14, 2010

(65) Prior Publication Data
US 2012/0090756 A1 Apr. 19, 2012

(30) Foreign Application Priority Data
Apr. 9, 2009 (FR) ................................. 09 52347

(51) Int. Cl.
*B60C 9/18* (2006.01)
*B32B 25/08* (2006.01)

(52) U.S. Cl.
CPC . *B32B 25/08* (2013.01); *B60C 9/18* (2013.01); *Y10T 152/10765* (2015.01)

(58) Field of Classification Search
CPC ....................................................... B60C 9/18

USPC .................................................. 152/526, 532
See application file for complete search history.

(56) References Cited

U.S. PATENT DOCUMENTS 3,177,277 A * 4/1965 Adams et al. .............. 264/210.7
5,040,583 A 8/1991 Lin et al.
(Continued)

FOREIGN PATENT DOCUMENTS

DE 102006010051 * 9/2007
EP 0 706 878 4/1996
(Continued)

OTHER PUBLICATIONS

Mylar: Physical-Thermal Properties. Datasheet [online]. DuPont Teijin Films, Jun. 2003. [retrieved Nov. 13, 2013]. Retrieved from Internet: <URL:http://usa.dupontteijinfilms.com/informationcenter/downloads/Physical_And_Thermal_Properties.pdf>.*
(Continued)

*Primary Examiner* — Justin Fischer
*Assistant Examiner* — Robert Dye
(74) *Attorney, Agent, or Firm* — Cozen O'Connor

(57) ABSTRACT

Pneumatic tire, the belt of which is reinforced by a multilayer laminate comprising at least one multiaxially drawn thermoplastic polymer film, such as for example a biaxially drawn PET film, placed between and in contact with two layers of rubber composition, such as natural rubber. Preferably, the thermoplastic polymer film has, irrespective of the tensile direction considered, a tensile modulus E which is greater than 500 MPa, a maximum tensile stress $\sigma_{max}$ which is greater than 80 MPa, and an elongation at break Ar greater than 40%. The above thermoplastic polymer film, placed between two layers of diene rubber compositions, can especially be used in the belt of pneumatic tires as a perforation-resistant protective film.

13 Claims, 3 Drawing Sheets

(56) References Cited

U.S. PATENT DOCUMENTS

| | | | |
|---|---|---|---|
| 5,156,921 A | | 10/1992 | Lin et al. |
| 5,236,030 A | | 8/1993 | Misawa et al. |
| 5,417,266 A | * | 5/1995 | Janus ............................ 152/200 |
| 5,992,486 A | * | 11/1999 | Katsuki et al. ................ 152/510 |
| 6,199,612 B1 | * | 3/2001 | Costa Pereira et al. ....... 152/532 |
| 6,460,585 B1 | * | 10/2002 | Osborne et al. ............ 152/209.1 |
| 2004/0129360 A1 | | 7/2004 | Vidal |
| 2009/0165919 A1 | | 7/2009 | Araujo Da Silva et al. |
| 2009/0283194 A1 | * | 11/2009 | Hashimoto et al. ........... 152/527 |

FOREIGN PATENT DOCUMENTS

| | | | |
|---|---|---|---|
| EP | 2 058 359 | | 5/2009 |
| JP | 11-034182 | | 2/1999 |
| JP | 11-189009 | | 7/1999 |
| JP | 2004-224277 | | 8/2004 |
| JP | 2005-169825 | | 6/2005 |
| JP | 2006-502270 | | 1/2006 |
| JP | 2008-126437 | * | 6/2008 |
| JP | 2009-534240 | | 9/2009 |
| WO | WO 2004/033548 | | 4/2004 |
| WO | WO 2007/121936 | | 11/2007 |

OTHER PUBLICATIONS

Polyethylene terephthalate, Polyester, PET, PETP. Datasheet [online]. Goodfellow, Oct. 16, 2007. [retrieved Nov. 13, 2013]. Retrieved from Internet: <URL:https://web.archive.org/web/20071016011147/http://www.goodfellow.com/csp/active/gfMaterialInfo.csp?text=*P&MATID=ES30&material=1>.*
English machine translation of JP2008-126437, dated Jun. 2008.*
Office Action dated Feb. 3, 2014 from Japanese Patent Office in corresponding Japanese application No. 2012-503988.

* cited by examiner

PNEUMATIC TIRE, THE BELT OF WHICH IS REINFORCED BY A THERMOPLASTIC POLYMER FILM

RELATED APPLICATIONS

This is a U.S. national stage under 35 USC §371 of application No. PCT/EP2010/054486, filed on Apr. 6, 2010.

This application claims the priority of French application no. 09/52347 filed Apr. 9, 2009, the entire content of which is hereby incorporated by reference.

FIELD OF THE INVENTION

The present invention relates to pneumatic tires and to reinforcing the crown reinforcement or belt thereof.

It relates more particularly to the use of multilayer laminates in the crown of such pneumatic tires, especially as layers for protecting against attack or perforation.

BACKGROUND OF THE INVENTION

A pneumatic tire having a radial carcass reinforcement comprises, in a known manner, a tread, two inextensible beads, two flexible sidewalls joining the beads to the tread and a rigid crown reinforcement or "belt" placed circumferentially between the carcass reinforcement and the tread.

The tire belt generally consists of superposed rubber plies which may contain metal or textile reinforcing threads, generally arranged parallel to one another within a given ply.

In particular, this belt may comprise one or more crown plies known as "protective" plies, in general located beneath the tread, the role of which protective plies is to protect the rest of the belt from external attack, tearing or other perforations. This is for example the general case in the belts of tires for heavy vehicles or civil engineering vehicles.

These protective plies must be sufficiently flexible and deformable so as, on the one hand, to follow as closely as possible the shape of the obstacle on which the belt bears during rolling and, on the other hand, to prevent the penetration of foreign bodies radially towards the inside of said belt. To meet such criteria requires the use, in these protective layers, of reinforcing threads in the form of cords having a high elasticity and a high fracture energy.

Steel cords known as "strand cords", also described as high elongation cords (HE cords) are normally used, these being assembled by the known technique of stranding and consisting of a plurality of metal strands twisted together in a helix, each strand comprising several steel wires which are also wound together in a helix.

Such elastic strand cords have been described in a large number of patents or patent applications, in particular to reinforce protective crown plies of tires for industrial vehicles such as heavy or civil engineering vehicles (see for example U.S. Pat. No. 5,843,583, U.S. Pat. No. 6,475,636, WO 2004/003287 (or US 2005/0183808), WO 2004/033789 or U.S. Pat. No. 7,089,726, WO 2005/014925 or US 2006/0179813).

However, these protective crown plies reinforced with metal strand cords have a certain number of drawbacks.

Firstly, these strand cords are relatively expensive, this being so on two counts: firstly, they are prepared in two steps, namely by the prior manufacture of the strands followed by assembly by twisting these strands, and, secondly, they generally require their wires to have a high twist (i.e. a very short helix pitch), this twist being essential in order to give them the desired elasticity but leading to low manufacturing rates. This drawback of course has repercussions on the cost of the tires themselves.

Other known drawbacks of these metal cords are their sensitivity to corrosion, their weight and their relatively large size (outside diameter).

SUMMARY OF THE INVENTION

One object of the invention is to provide a light and high-performance multilayer laminate that makes it possible in particular to replace the conventional plies reinforced with steel cords and therefore to overcome the aforementioned drawbacks.

Thus, one aspect of the present invention relates to a pneumatic tire, the belt of which is reinforced by a multilayer laminate, characterized in that said laminate comprises at least one multiaxially drawn thermoplastic polymer film placed between and in contact with two layers of rubber composition.

This multilayer laminate has a flexible and highly deformable structure which unexpectedly turns out to have a high resistance to perforation forces, equivalent to that of conventional fabrics reinforced with metal cords, despite a substantially smaller thickness.

Owing in particular to its reduced thickness, this laminate also has the advantage of having a low hysteresis in comparison with these conventional fabrics. A major objective of manufacturers of pneumatic tires is precisely to lower the hysteresis of the constituents thereof in order to reduce the rolling resistance of these tires.

The pneumatic tires of the invention may be intended for motor vehicles of the passenger, 4×4 and SUV (Sport Utility Vehicle) type, but also for two-wheel vehicles, such as motorcycles or bicycles, or for industrial vehicles chosen from vans, "heavy" vehicles—i.e., underground trains, buses, heavy road transport vehicles (lorries, towing vehicles, trailers), off-road vehicles—, agricultural or civil engineering machines, aircraft and other transport or handling vehicles.

DEFINITIONS

Figure 1:
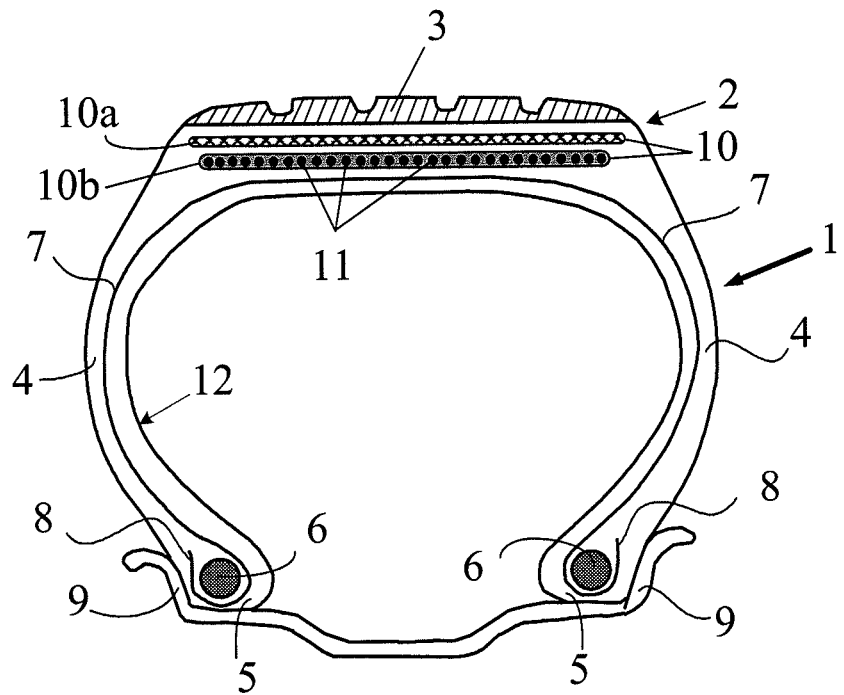
FIGS. 1 and 2 show, in radial section, two examples of pneumatic tires in accordance with an embodiment of the invention, incorporating into their belt a multilayer laminate in accordance with an embodiment of the invention.

In the present application, the following definitions are adopted:

"rubber" or "elastomer" (the two terms being considered to be synonymous): any type of diene or non-diene, for example thermoplastic, elastomer;

"diene rubber": any elastomer (single elastomer or mixture of elastomers) that results, at least in part (i.e., a homopolymer or a copolymer), from diene monomers, i.e. monomers bearing two carbon-carbon double bonds, whether the latter are or are not conjugated;

"layer": a strip or any other three-dimensional element having a relatively small thickness relative to its other dimensions, for which the ratio of the thickness to the largest of the other dimensions is less than 0.5, preferably less than 0.1;

"sheet" or "film": any thin layer for which the ratio of the thickness to the smallest of the other dimensions is less than 0.1;

"reinforcing thread": any long thin strand, any elementary filament, any multifilament fibre or any assembly of such filaments or fibres such as folded yarns or cords, having a long length relative to its cross section, capable of strengthening the tensile properties of a rubber matrix, this thread possibly being straight or non-straight, for example twisted, or crimped;

"laminate" or "multilayer laminate": within the meaning of the International Patent Classification, any product comprising at least two layers, of flat or non-flat form, which are in contact with one another, the latter possibly or possibly not being joined or connected together; the expression "joined" or "connected" should be interpreted broadly so as to include all means of joining or assembling, in particular via adhesive bonding.

Moreover, unless expressly indicated otherwise, all the percentages (%) shown are % by weight.

Any range of values denoted by the expression "between a and b" represents the field of values ranging from more than a to less than b (that is to say limits a and b excluded) whereas any range of values denoted by the expression "from a to b" means the field of values ranging from a up to b (that is to say including the strict limits a and b).

DETAILED DESCRIPTION OF THE DRAWINGS

The pneumatic tire of the invention therefore has, as an essential feature, the fact that its crown reinforcement or belt is reinforced by a multilayer laminate comprising at least one multiaxially drawn thermoplastic polymer film placed between and in contact with two layers of rubber composition, which film and layers will be described in detail below.

Any thermoplastic polymer film that is multiaxially drawn, that is to say drawn or oriented in more than one direction, can be used. Such multiaxially drawn films are well known, used mainly to date in the packaging industry, the food industry, in the electrical field or else as a support for magnetic coatings.

They are prepared according to various well-known drawing techniques, all intended to give the film good mechanical properties in several main directions rather than in a single direction as is the case for standard thermoplastic polymer fibres (for example PET or Nylon fibres) which are, in a known manner, uniaxially drawn during the melt spinning thereof.

Such techniques require multiple drawing operations in several directions, longitudinal drawing, transverse drawing and planar drawing operations. By way of example, mention may especially be made of the biaxial stretch-blow moulding technique. The drawing operations may be carried out in one or more stages; when there are several drawing operations these may be simultaneous or sequential. The draw ratio or ratios applied are a function of the targeted final mechanical properties, generally greater than 2.

Multiaxially drawn thermoplastic polymer films and also the methods for obtaining them have been described in numerous patent documents, for example in documents FR 2539349 (or GB 2134442), DE 3621205, EP 229346 (or U.S. Pat. No. 4,876,137), EP 279611 (or U.S. Pat. No. 4,867,937), EP 539302 (or U.S. Pat. No. 5,409,657) and WO 2005/011978 (or US 2007/0031691).

Preferably, the thermoplastic polymer film used has, irrespective of the tensile direction considered, a tensile modulus, denoted by E, which is greater than 500 MPa (especially between 500 and 4000 MPa), more preferably greater than 1000 MPa (especially between 1000 and 4000 MPa), more preferably still greater than 2000 MPa. Values of the modulus E between 2000 and 4000 MPa, in particular between 3000 and 4000 MPa are particularly desirable, especially for reinforcing pneumatic tires.

According to another preferred embodiment, irrespective of the tensile direction considered, the maximum tensile stress, denoted by $\sigma_{max}$, of the thermoplastic polymer film is preferably greater than 80 MPa (especially between 800 and 200 MPa), more preferably greater than 100 MPa (especially between 100 and 200 MPa). Values of the stress $\sigma_{max}$ greater than 150 MPa, in particular between 150 and 200 MPa, are particularly desirable, especially for reinforcing pneumatic tires.

According to another preferred embodiment, irrespective of the tensile direction considered, the yield point, denoted by Yp of the thermoplastic polymer film is located above 3% elongation, especially between 3 and 15%. Values of Yp above 4%, in particular between 4 and 12%, are particularly desirable, especially for reinforcing pneumatic tires.

According to another preferred embodiment, irrespective of the tensile direction considered, the thermoplastic polymer film has an elongation at break, denoted by Ar, which is greater than 40% (especially between 40 and 200%), more preferably greater than 50%. Values of Ar between 50 and 200% are particularly desirable, especially for reinforcing pneumatic tires.

The abovementioned mechanical properties are well known to a person skilled in the art, deduced from force-elongation curves, measured for example according to the standard ASTM D638-02 for strips having a thickness greater than 1 mm, or else according to the standard ASTM D882-09 for thin sheets or films, the thickness of which is at most equal to 1 mm; the above modulus E and stress $\sigma_{max}$ values, expressed in MPa, are calculated with respect to the initial cross section of the test specimen subjected to the tensile test.

The thermoplastic polymer film used is preferably of the thermally stabilized type, i.e. it has undergone, after drawing, one or more heat treatments intended, in a known manner, to limit the thermal contraction (or shrinkage) thereof at high temperature; such heat treatments may especially consist of post-curing or hardening treatments, or combinations of such post-curing or hardening treatments.

Thus, and preferably, the thermoplastic polymer film used has, after 30 min at 150° C., a contraction relative to its length which is less than 5%, preferably less than 3% (measured, unless otherwise indicated, according to ASTM D1204-08).

The melting point of the thermoplastic polymer used is preferably chosen to be above 100° C., more preferably above 150° C., in particular above 200° C. especially in the case of reinforcing pneumatic tires.

The thermoplastic polymer is preferably chosen from the group consisting of polyamides, polyesters and polyimides, more particularly from the group consisting of polyamides and polyesters. Among the polyamides, mention may especially be made of the polyamides PA-4,6, PA-6, PA-6,6, PA-11 or PA-12. Among the polyesters, mention may be made, for example, of PET (polyethylene terephthalate), PEN (polyethylene naphthalate), PBT (polybutylene terephthalate), PBN (polybutylene naphthalate), PPT (polypropylene terephthalate) and PPN (polypropylene naphthalate).

The thermoplastic polymer is preferably a polyester, more preferably a PET or PEN.

Examples of multiaxially drawn PET thermoplastic polymer films, suitable for the invention, are for example the biaxially drawn PET films sold under the names "Mylar" and "Melinex" (DuPont Teijin Films), or else "Hostaphan" (Mitsubishi Polyester Film).

In the multilayer laminate of the pneumatic tire of the invention, the thickness $e_1$ of the thermoplastic polymer film is preferably between 0.05 and 1 mm, more preferably between 0.1 and 0.7 mm. For example, film thicknesses of 0.20 to 0.60 mm have proved to be perfectly suitable for most uses.

The thermoplastic polymer film may comprise additives added to the polymer, especially at the moment when the latter is formed, these additives possibly being, for example, agents for protecting against ageing, plasticizers, fillers such as silica, clays, talc, kaolin or else short fibres; fillers may for example be used to make the surface of the film rough and thus contribute to improving the adhesive uptake thereof and/or the adhesion thereof to the rubber layers with which said film is intended to be in contact.

Each layer of rubber composition, or hereinbelow "rubber layer", which is a constituent of the multilayer laminate of the pneumatic tire of the invention is based on at least one elastomer.

Preferably, the rubber is a diene rubber. Diene elastomers can, in a known manner, be classified into two categories: "essentially unsaturated" or "essentially saturated". The term "essentially unsaturated" is understood to mean a diene elastomer resulting at least in part from conjugated diene monomers having a content of units of diene origin (conjugated dienes) which is greater than 15% (mol %). Thus it is that diene elastomers such as butyl rubbers or copolymers of dienes and of a-olefins of EPDM type do not come under the preceding definition and can especially be described as "essentially saturated" diene elastomers (low or very low content of units of diene origin, always less than 15%). In the category of "essentially unsaturated" diene elastomers, the term "highly unsaturated" diene elastomer is understood to mean in particular a diene elastomer having a content of units of diene origin (conjugated dienes) which is greater than 50%.

Although it is applicable to any type of diene elastomer, the present invention is preferably carried out with a diene elastomer of the highly unsaturated type.

This diene elastomer is more preferably chosen from the group consisting of polybutadienes (BRs), natural rubber (NR), synthetic polyisoprenes (IRs), the various butadiene copolymers, the various isoprene copolymers and mixtures of these elastomers, such copolymers being especially chosen from the group consisting of butadiene/stirene copolymers (SBRs), isoprene/butadiene copolymers (BIRs), isoprene/stirene copolymers (SIRs) and isoprene/butadiene/stirene copolymers (SBIRs).

One particularly preferred embodiment consists in using an "isoprene" elastomer, that is to say an isoprene homopolymer or copolymer, in other words a diene elastomer chosen from the group consisting of natural rubber (NR), synthetic polyisoprenes (IRs), the various isoprene copolymers and mixtures of these elastomers. The isoprene elastomer is preferably natural rubber or a synthetic cis-1,4-polyisoprene. Use is preferably made, among these synthetic polyisoprenes, of polyisoprenes having a content (molar %) of cis-1,4-bonds of greater than 90%, more preferably still of greater than 98%.

According to one preferred embodiment, each layer of rubber composition comprises 50 to 100 phr of natural rubber. According to other preferred embodiments, the diene elastomer may be constituted, completely or partly, of another diene elastomer such as, for example, an SBR elastomer used as a blend with another elastomer, for example of BR type, or used alone.

The rubber composition may contain a single diene elastomer or several diene elastomers, the diene elastomer(s) possibly being used in combination with any type of synthetic elastomer other than a diene elastomer, or even with polymers other than elastomers. The rubber composition may also contain all or some of the additives customarily used in rubber matrices intended for the manufacture of tires, such as, for example, reinforcing fillers such as carbon black or silica, coupling agents, anti-ageing agents, antioxidants, plasticizing agents or extender oils, whether the latter be of the aromatic or non-aromatic kind (notably oils that are very weakly aromatic or non-aromatic, for example of the naphthenic or paraffinic type, with a high or preferably a low viscosity, MES or TDAE oils), plasticizing resins with a high $T_g$ in excess of 30° C., processing aids that make the compositions easier to process in the raw state, tackifying resins, anti-reversion agents, methylene acceptors and donors such as HMT (hexamethylenetetramine) or H3M (hexamethoxymethylmelamine) for example, reinforcing resins Ouch as resorcinol or bismaleimide), known adhesion promoting systems of the metallic salts type for example, notably cobalt, nickel or lanthanide salts and a crosslinking or vulcanization system.

Preferably, the system for crosslinking the rubber composition is a vulcanization system, i.e. a system based on sulphur (or on a sulphur donor) and on a primary vulcanization accelerator. Various known secondary vulcanization accelerators or vulcanization activators may be added to this base vulcanization system. The sulphur is used at a preferred content between 0.5 and 10 phr, the primary vulcanization accelerator, for example a sulphenamide, is used at a preferred content between 0.5 and 10 phr. The content of reinforcing filler, for example of carbon black or silica, is preferably greater than 50 phr, especially between 50 and 150 phr.

All carbon blacks, in particular blacks of the HAF, ISAF or SAF type, conventionally used in tires ("tire-grade" blacks) are suitable as carbon blacks. Mention will more particularly be made, among the latter, of the carbon blacks of the 300, 600 or 700 (ASTM) grade (for example, N326, N330, N347, N375, N683 or N772). Precipitated or pyrogenic silicas having a BET surface area of less than 450 $m^2/g$, preferably of 30 to 400 $m^2/g$, are in particular suitable as silicas.

A person skilled in the art will know, in light of the present description, how to adjust the formulation of the rubber composition in order to achieve the desired levels of properties (especially modulus of elasticity), and to adapt the formulation to the specific application envisaged.

Preferably, the rubber composition has, in the crosslinked state, a secant tensile modulus, at 10% elongation, which is between 4 and 25 MPa, more preferably between 4 and 20 MPa; values between in particular 5 and 15 MPa have proved to be particularly suitable for reinforcing the belts of pneumatic tires. The modulus measurements are carried out in tensile tests, unless otherwise indicated according to the ASTM D 412 standard of 1998 (test specimen "C"): the "true" secant modulus (i.e. that with respect to the actual cross section of the test specimen) at 10% elongation, denoted here by Ms and expressed in MPa is measured in a second elongation (i.e. after an accommodation cycle), under normal temperature and moisture conditions according to the ASTM D 1349 (1999) standard.

In the multilayer laminate of the pneumatic tire of the invention, the thickness $e_2$ of each layer of rubber is preferably between 0.05 and 2 mm, more preferably between 0.1 and 1 mm. For example, thicknesses of 0.2 to 0.8 mm have proved to be perfectly suitable in most cases.

Preferably, the multilayer laminate of the tire of the invention has a width and a length which are respectively greater than 2.5 mm and 10 cm, more preferably respectively greater than 5 mm and 20 cm.

The thermoplastic polymer film may be used as is, i.e. as available commercially, or else re-cut in the form of narrow strips or bands, the width of which may vary to a very large extent depending on the targeted applications.

According to one preferred embodiment, in the multilayer laminate of the pneumatic tire of the invention, the thermoplastic polymer film is provided with an adhesive layer facing each layer of rubber composition with which it is in contact.

In order to adhere the rubber to the thermoplastic polymer film, use could be made of any appropriate adhesive system, for example a simple textile adhesive of the "RFL" (resorcinol-formaldehyde-latex) type comprising at least one diene elastomer such as natural rubber, or any equivalent adhesive known for imparting satisfactory adhesion between rubber and conventional thermoplastic fibres such as polyester or polyamide fibres.

By way of example, the adhesive coating process may essentially comprise the following successive steps: passage through a bath of adhesive, followed by draining (for example by blowing, calibrating) to remove the excess adhesive; then drying, for example by passing into an oven (for example for 30 s at 180° C.) and finally heat treatment (for example for 30 s at 230° C.).

Before the above adhesive coating process, it may be advantageous to activate the surface of the film, for example mechanically and/or physically and/or chemically, to improve the adhesive uptake thereof and/or the final adhesion thereof to the rubber. A mechanical treatment could consist, for example, of a prior step of matting or scratching the surface; a physical treatment could consist, for example, of a treatment via radiation such as an electron beam; a chemical treatment could consist, for example, of prior passage into a bath of epoxy resin and/or isocyanate compound.

Since the surface of the thermoplastic polymer film is, as a general rule, particularly smooth, it may also be advantageous to add a thickener to the adhesive used, in order to improve the total adhesive uptake of the film during the adhesive coating thereof.

A person skilled in the art will readily understand that, in the multilayer laminate, the connection between the thermoplastic polymer film and each layer of rubber with which it is in contact is definitively provided during the final curing (crosslinking) of the pneumatic tire of the invention.

The multilayer laminate described previously can be used as a reinforcing element, in particular as an element for protecting against perforation, in any type of pneumatic tire, especially in pneumatic tires intended for all types of vehicles, in particular for passenger vehicles or industrial vehicles such as heavy vehicles, civil engineering vehicles, aircraft, and other transport or handling vehicles.

By way of example, appended FIG. 1 very schematically represents, not to a specific scale, a radial cross section of a pneumatic tire in accordance with the invention.

This pneumatic tire 1 comprises a crown 2 surmounted by a tread 3, two sidewalls 4 and two beads 5, each of these beads 5 being reinforced by a bead wire 6. A carcass reinforcement 7 is wound around the two bead wires 6 in each bead 4, the turn-up 8 of this reinforcement 7 being positioned for example towards the outside of the tire 1, which is shown here mounted on its rim 9. The crown 2 is reinforced here by a crown reinforcement or belt 10 made up of at least two different reinforcing structures (10a, 10b).

This pneumatic tire 1 has the novel and essential feature that its belt 10 (or its crown 2, which amounts to the same thing) comprises at least one multilayer laminate 10a, positioned radially between the tread 3 and the carcass reinforcement 7, said multilayer laminate 10a itself consisting of the multiaxially drawn thermoplastic polymer film positioned between two layers of rubber with which it is in contact.

In this tire 1 illustrated in FIG. 1, it will be understood that the tread 3, the multilayer laminate 10a, the crown reinforcing structure 10b and the carcass reinforcement 7 may or may not be in contact with one another, even though these parts have been deliberately separated in the schematic FIG. 1, for reasons of simplification and clarity of the drawing. They could be physically separated, at the very least for a portion of them, for example by bonding rubbers, well known to a person skilled in the art, intended to optimize the cohesion of the assembly after curing or crosslinking.

Figure 4:
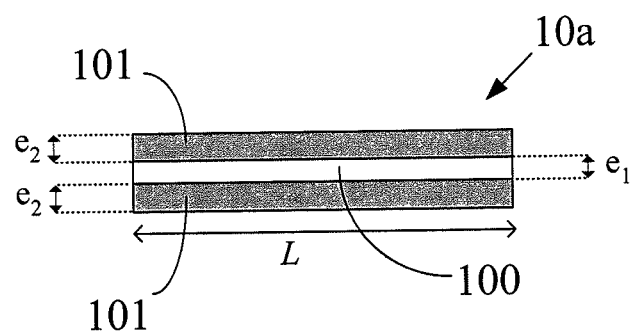
FIG. 4 shows, in cross section, a multilayer laminate that can be used in accordance with an embodiment of the invention.

The multilayer laminate 10a as illustrated in greater detail in FIG. 4 here consists of a film 100 of biaxially-drawn PET, having a thickness $e_1$ for example equal to around 0.35 mm, sandwiched between two layers 101 of rubber composition, having a thickness $e_2$ for example equal to around 0.4 mm, the laminate therefore having a total thickness ($e_1$-2$e_2$) for example of around 1.15 mm. The rubber composition used here is a conventional composition for the calendering of metal plies of a belt for a pneumatic tire, typically based on natural rubber, carbon black, a vulcanization system and customary additives. The adhesion between the PET film and each layer of rubber is provided by an adhesive of the RFL type which has been deposited, in a known manner, as indicated previously.

In FIG. 1 illustrating a first preferred embodiment of the invention, it is seen that the multilayer laminate 10a constitutes, within the belt 10, a structure or screen for protecting the crown, located under the tread and responsible for protecting the rest of the belt, in the case of this example the crown reinforcing structure 10b, against outside attack, tearing, or other perforations that may occur when the pneumatic tire is rolling.

Advantageously, the multilayer laminate also has the role of constituting a screen or a barrier to water and to oxygen, such elements being corrosive with respect to metal cords present in the rest of the pneumatic tire of the invention, especially in the belt itself or in its carcass reinforcement.

Figure 2:
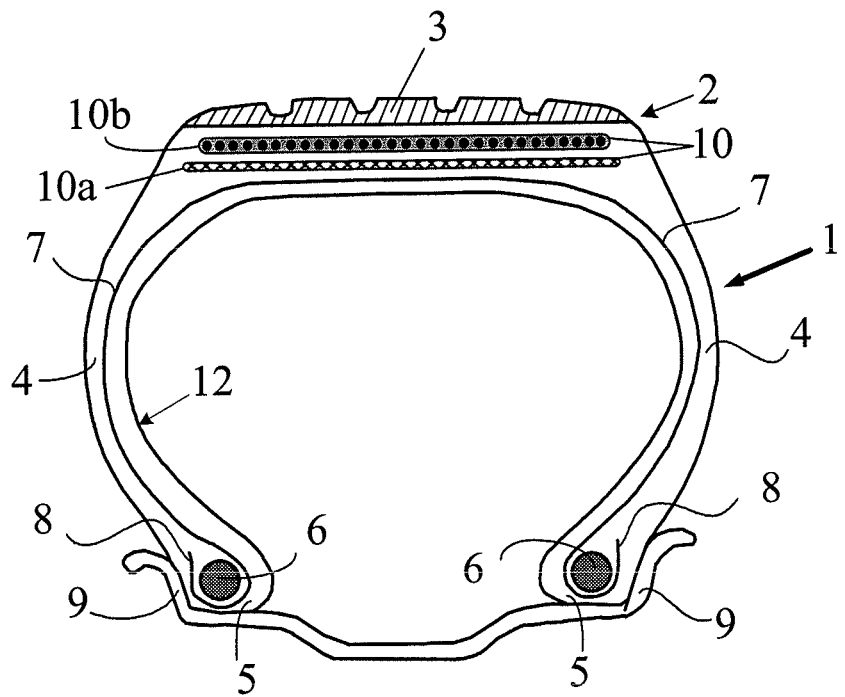

Appended FIG. 2 illustrates another possible embodiment of the invention in which the multilayer laminate 10a constitutes, within this same belt 10, a structure or screen for protecting the crown, located this time under the crown reinforcing structure 10b and responsible for protecting the rest of the pneumatic tire, in the case of this example its carcass reinforcement 7.

According to another possible embodiment of the invention, two structures (multilayer laminates) 10a for protecting the crown could also be positioned on either side, radially, of the crown reinforcing structure 10b.

In the above representations of FIGS. 1 and 2, the carcass reinforcement 7 is, in a manner known per se, constituted of at least one rubber ply reinforced with "radial", for example textile or metal, reinforcing threads, that is to say that these reinforcing threads are positioned practically parallel to one another and extend from one bead to the other so as to form an angle of between 80° and 90° with the median circumferential plane (plane perpendicular to the axis of rotation of the tire which is located halfway between the two beads 4 and passes through the middle of the crown reinforcement 10).

These radial reinforcing threads are, for example, made of steel, polyester, nylon, aramid, cellulose, polyketone, or else are of hybrid or composite type, that is to say constituted of a mixture of the aforementioned materials, such as for example hybrid aramid-nylon cords.

The crown reinforcing structure 10b of the belt 10 is for example constituted, in a manner known per se, of a rubber ply reinforced by "circumferential", for example textile or metal, reinforcing threads 11, that is to say that these reinforcing threads are positioned practically parallel to one another and extend substantially circumferentially around the pneumatic tire so as to form an angle preferably within a range from 0° to 10° with the median circumferential plane. It is recalled that the prime role of these reinforcing threads 11 is to withstand the centrifugation of the crown at high speed.

As examples of circumferential reinforcing threads 11, cords made of carbon steel or stainless steel, textile cords consisting of fibres twisted together, in particular and preferably cords known for their dimensional stability relative to temperature and/or moisture, can for example be used. The textile fibres of these cords are for example chosen from the group consisting of polyvinyl alcohol fibres, aromatic polyamide (or "aramid") fibres, aliphatic polyamide (or "Nylon") fibres, polyester (e.g. PET or PEN) fibres, aromatic polyester fibres, cellulose (for example rayon, viscose) fibres, polyphenylene benzobisoxazole fibres, polyketone fibres, glass fibres, carbon fibres and ceramic fibres. Particularly preferably, mention will especially be made of reinforcing threads made of carbon steel, aramid, polyester, nylon, cellulose, polyketone, and also hybrid reinforcing threads consisting of these various materials, such as aramid/nylon cords.

The above radial or circumferential reinforcing threads may adopt any known form, they may be, for example, individual monofilaments of large diameter (for example and preferably greater than or equal to 50 μm), multifilament fibres (constituted of a plurality of individual filaments of small diameter, typically less than 30 μm), textile folded yarns formed of several fibres twisted together, textile or metal cords formed of several fibres or monofilaments cabled or twisted together.

The reinforcing structure 10b of the belt 10 could also consist, in a manner well known to a person skilled in the art, of at least two superposed and crossed plies known as "working plies" or "triangulation plies", reinforced with metal cords positioned substantially parallel to one another and inclined relative to the median circumferential plane, it being possible for these working plies to be combined with other rubber fabrics and/or plies. The prime role of these working plies is to give the pneumatic tire a high cornering stiffness.

Figure 3:
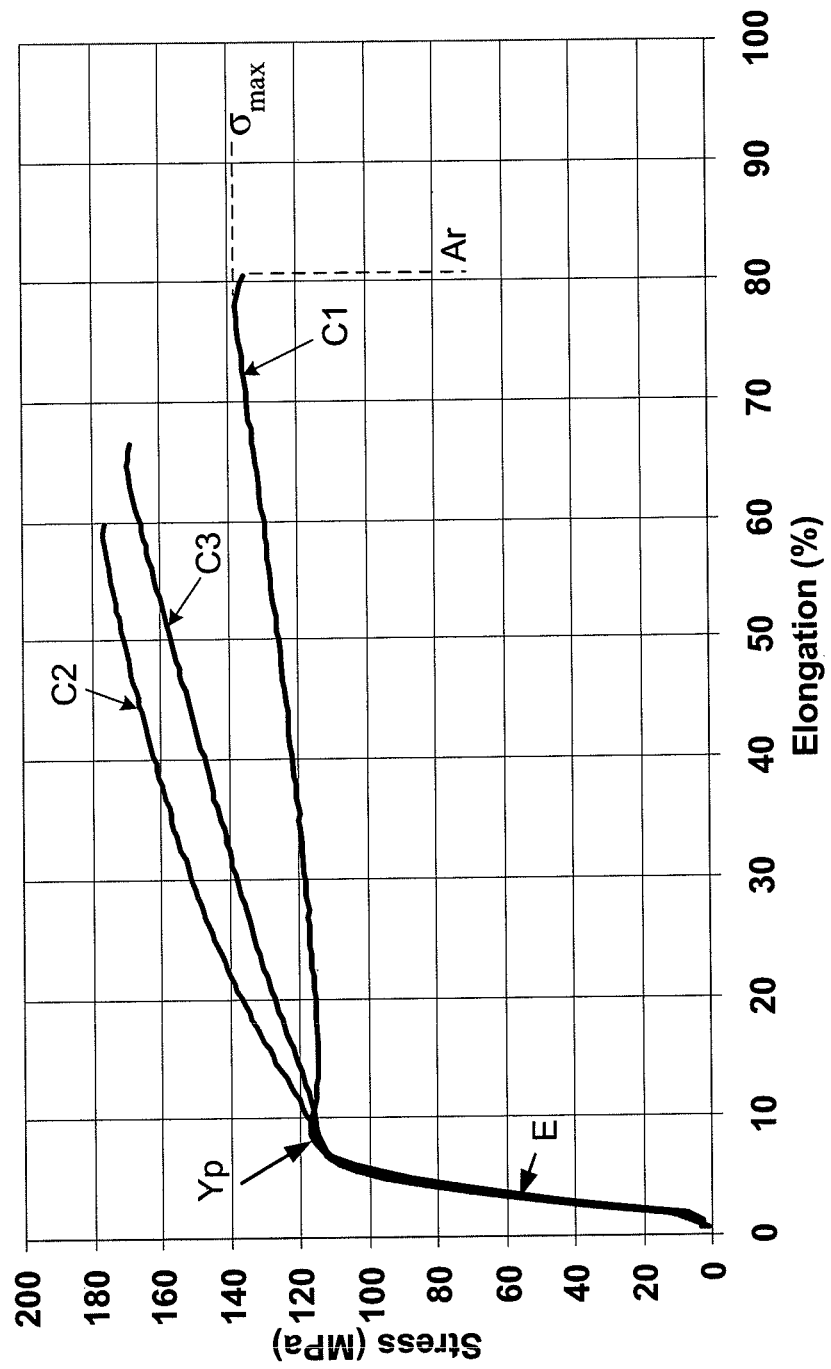
FIG. 3 shows stress-elongation curves recorded, in three tensile directions, on a multiaxially oriented thermoplastic polymer (PET) film, that can be used in the multilayer laminate reinforcing the pneumatic tire according to an embodiment of the invention.

FIG. 3 reproduces the stress-elongation curves recorded on the biaxially-drawn PET film ("Mylar A" from DuPont Teijin Films, with a thickness of 0.35 mm) which is used in the examples of pneumatic tires in accordance with the invention described previously.

The curves denoted by C1, C2 and C3 correspond to a tensile test carried out, respectively, along the main orientation of the film corresponding to the extrusion direction (also known under the name of "MD" direction for "Machine Direction"), along an orientation normal to the MD direction (known under the name of "TD" direction for "Transverse Direction"), and finally along an oblique direction (angle of 45°) relative to the two preceding directions (MD and TD). Mechanical properties such as tensile modulus (E), maximum tensile stress ($\sigma_{max}$), yield point Yp and elongation at break (Ar), as indicated in FIG. 3, may be deduced, in a manner well known to a person skilled in the art, from these tensile test curves.

These tensile test curves were recorded and the mechanical properties measured, unless otherwise indicated according to the ASTM D882-09 standard, on test specimens of films in the form of dumbbells having a width of 4 mm and a length of 30 mm (working portion subjected to tensile testing), and having a thickness $e_1$ equal to that of the thermoplastic polymer film tested, pulled at a rate of 200 mm/min.

On reading FIG. 3, it is observed in particular that the multiaxially drawn thermoplastic polymer film has, which corresponds to another preferred embodiment of the invention, irrespective of the tensile direction considered, the following mechanical properties (deduced from the stress-elongation curves from FIG. 3):

a tensile modulus E greater than 500 MPa;
a maximum tensile stress $\sigma_{max}$ greater than 100 MPa;
a yield point Yp between 5 and 10%;
an elongation at break denoted by Ar greater than 50%.

The quality of the reinforcement provided by the multilayer laminate to the belt of the pneumatic tire of the invention may be evaluated by a perforation test that consists in measuring the resistance to perforation by a given indentor. The principle of this test is well known, described for example in the ASTM F1306-90 standard.

Figure 5:
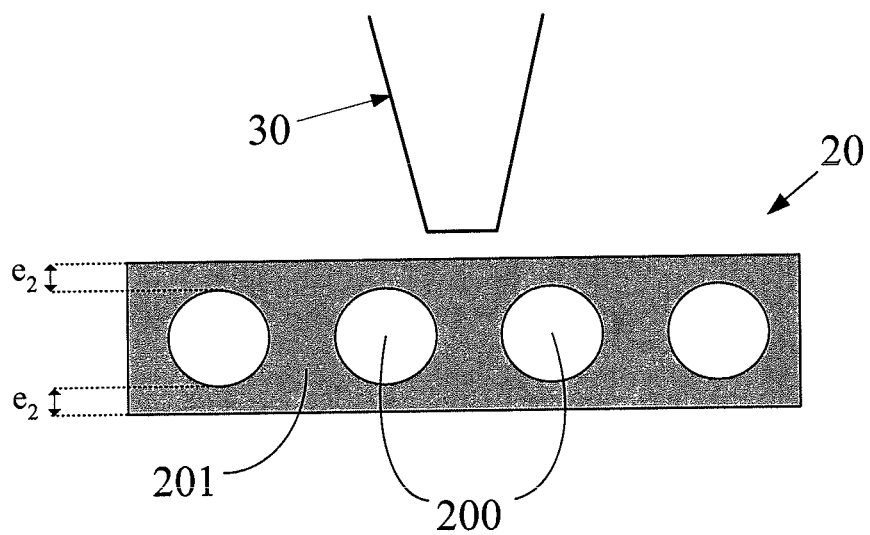
FIG. 5 shows, in cross section, a conventional protective crown ply comprising high-elongation metal cords.

During comparative perforation tests, the following were tested:

on the one hand, a multilayer laminate (10a) comprising the biaxially drawn film (100) described above, having a thickness $e_1$ simply positioned between two layers of rubber (101) having a thickness $e_2$, as illustrated in FIG. 4;

on the other hand, for comparison, a conventional metallic fabric comprising a series of steel multistrand cords (200) positioned parallel to one another, in a plane, according to a lay pitch of around 2.5 mm, said series of cords being coated in rubber (201), as illustrated in FIG. 5; the thickness of rubber at the back of the cords is here equal to $e_2$, i.e. around 0.4 mm.

These multistrand cords (200) of "6×0.35" or "3×2×0.35" construction are cords that each consist of 3 strands (strands not represented in FIG. 5, for simplification) of 2 threads with a 0.35 mm diameter, assembled together by cabling, in order to form elastic (i.e., high-elongation or HE) metal cords well known for reinforcing protective crown plies of pneumatic tires for industrial vehicles as described in the introduction of the present document (see for example the aforementioned application WO 2004/033789). The total diameter (or envelope diameter) of these cords is around 1.4 mm, so the final metal fabric has a total thickness of around 2.2 mm.

FIGS. 4 and 5 have been represented on substantially the same scale (scale 1) in order to illustrate the significant difference in thickness that there is between the multilayer laminate used in accordance with the invention (10a) and the conventional metallic fabric (20).

In the multilayer laminate of the pneumatic tire of the invention, the width "L" of the film (100) is preferably identical to the width of the two layers of rubber (101) between which it is positioned, as shown schematically in FIG. 4. But the invention of course applies to the cases where this width L is different, smaller or larger; for example, the thermoplastic polymer film, in this multilayer laminate, could consist of a plurality of narrower strips or bands, for example juxtaposed and oriented along a main direction identical to or different from that of the two rubber layers.

The metal indentor used (illustrated in FIG. 5 under the reference 30) was of cylindrical shape (diameter 4.5 mm±0.05 mm), conical at its end (angle of 30°±2°) and truncated to a diameter of 1 mm. The sample of composite tested (multilayer laminate according to the invention or control metallic fabric) was attached to a metal support having a thickness of 18 mm which was pierced, in line with the indentor, by a hole having a diameter of 12.7 mm to allow the indentor to pass freely through the perforated sample and its support plate.

Then, in order to characterize the perforation resistance, the force-displacement curve of the above indentor (equipped with sensors connected to the tensile-testing machine), passing through the sample at a rate of 10 cm/min, was recorded.

Table 1 below gives the details of the measurements recorded, the base 100 being used for the control composite: the bending modulus represents the initial gradient of the force-displacement curve; the force at perforation is the maximum force recorded before perforation of the sample by the tip of the indentor; the elongation at perforation is the relative elongation recorded at the moment of perforation.

TABLE 1

| Composite tested: | Thickness (mm) | Bending modulus | Force at perforation | Elongation at perforation |
|---|---|---|---|---|
| Control | 2.20 | 100 | 100 | 100 |
| Invention | 1.15 | 93 | 92 | 103 |

On reading Table 1, it is observed that the multilayer laminate of the pneumatic tire of the invention surprisingly has, despite a thickness that is pratically halved relative to the control solution and the absence of reinforcing threads, a perforation resistance that is almost equivalent to that of the standard metallic fabric.

Other running tests on pneumatic tires for passenger vehicles, the belt of which comprised a multilayer laminate in accordance with the invention, the multiaxially drawn thermoplastic polymer film (biaxially drawn PET) of which was in the form of strips having a width of around 30 mm, juxtaposed and inclined by 40° relative to the median circumferential plane. This belt simply consisted of the above multilayer laminate (10a) and of a reinforcing structure (10b) (circumferential reinforcing threads 11 made of aramid), as shown schematically in FIG. 1. These tests were carried out in order to measure the drift thrust or cornering of these pneumatic tires; it is recalled that a high drift thrust or cornering gives pneumatic tires very good road handling on a motor vehicle.

For the requirements of these tests, each pneumatic tire tested is fitted on a wheel of suitable size and inflated to 2.2 bar. It is run at a constant speed of 80 km/h on a suitable automatic machine (machine of "sol-plan" type sold by MTS). The load "Z" is varied, at a drift angle of 1 degree, and the cornering stiffness or drift thrust "D" (corrected for the thrust at zero drift) is measured in a known manner, by recording the transverse force on the wheel as a function of this load Z using sensors. The drift thrust is the gradient at the origin of the curve D(Z).

It was observed, surprisingly, that these pneumatic tires of the invention, despite their particularly simple and lightened belt structure, in particular without the two conventional working plies described previously, developed a drift thrust equivalent to that observed on a conventional belt comprising the two working plies and the structure 10b of circumferential reinforcing threads (but without the multilayer laminate).

Consequently, there are many advantages of the multilayer laminate of the pneumatic tire of the invention (in particular small thickness, low density, low cost, insensitivity to corrosion) compared to conventional metallic fabrics, and the results obtained owing to the invention suggest a very large number of possible applications as an element for reinforcing the belt of pneumatic tires, positioned between the tread and the carcass reinforcement of such tires.

The multilayer laminate described previously can advantageously be used not only in pneumatic tires for passenger vehicles, but also in all types of pneumatic tires for industrial vehicles, in particular for industrial vehicles intended to face severe or aggressive rolling conditions, such as, for example, heavy road transport vehicles, off-road vehicles such as agricultural or civil-engineering vehicles, for aircraft and other transport or handling vehicles.

The invention claimed is:

1. A pneumatic tire, comprising a belt of which is that is reinforced by a multilayer laminate,
   wherein said laminate comprises at least one multiaxially drawn thermoplastic polymer film placed between and in contact with two layers of rubber composition,
   wherein the thermoplastic polymer film has, irrespective of the tensile direction considered, a tensile modulus, denoted by E, which is between 2000 MPa and 4000 MPa, and a maximum tensile stress, denoted by $\sigma_{max}$, which is between 100 MPa and 200 MPa,
   wherein the rubber composition has a secant tensile modulus, at 10% elongation, measured according to ASTM D412, which is between 4 MPa and 25 MPa, and
   wherein the belt of the tire is without a metallic working ply.

2. The tire of claim 1, wherein the rubber is a diene rubber.

3. The tire of claim 2, wherein the diene rubber is chosen from the group consisting of polybutadienes, natural rubber, synthetic polyisoprenes, the various butadiene copolymers, the various isoprene copolymers and mixtures of these elastomers.

4. The tire of claim 3, wherein each layer of rubber composition comprises 50 to 100 phr of natural rubber.

5. The tire of claim 1, wherein the thermoplastic polymer film has, irrespective of the tensile direction considered, an elongation at break, denoted by Ar, which is greater than 40%.

6. The tire of claim 1, wherein the thermoplastic polymer film is thermally stabilized.

7. The tire of claim 1, wherein the thermoplastic polymer film has, after 30 min at 150° C., a relative shrinkage in length which is less than 5%.

8. The tire of claim 1, wherein the thermoplastic polymer is a polyester.

9. The tire of claim 8, wherein the polyester is a polyethylene terephthalate or a polyethylene naphthalate.

10. The tire of claim 1, wherein the thickness of the thermoplastic polymer film is between 0.05 and 1 mm.

11. The tire of claim 1, wherein the thickness of each layer of rubber composition is between 0.05 and 2 mm.

12. The tire of claim 1, wherein the width and the length of the multilayer laminate are respectively greater than 2.5 mm and 10 cm.

13. The tire of claim 1, wherein the thermoplastic polymer film is provided with an adhesive layer facing each layer of rubber composition.

* * * * *